(No Model.) 3 Sheets—Sheet 1.

H. N. CURTIS.
ELECTRIC CONDUIT.

No. 435,536. Patented Sept. 2, 1890.

Witnesses
Jas. J. Maloney
W. J. Lockett

Inventor
Herbert N. Curtis
by Jos. P. Livermore
Att'y (No Model.) 3 Sheets—Sheet 2.

H. N. CURTIS.
ELECTRIC CONDUIT.

No. 435,536. Patented Sept. 2, 1890.

Witnesses
Jos. J. Maloney
W. J. Locke

Inventor
Herbert N. Curtis
by Jos. P. Livermore
Att'y (No Model.) 3 Sheets—Sheet 3.

H. N. CURTIS.
ELECTRIC CONDUIT.

No. 435,536. Patented Sept. 2, 1890.

Witnesses
Jas. J. Maloney
C. J. Locke

Inventor
Herbert N. Curtis
by Jno. P. Livermore
Atty.

UNITED STATES PATENT OFFICE.

HERBERT N. CURTIS, OF NEW YORK, N. Y.

ELECTRIC CONDUIT.

SPECIFICATION forming part of Letters Patent No. 435,536, dated September 2, 1890.

Application filed March 31, 1890. Serial No. 345,999. (No model.)

*To all whom it may concern:*

Be it known that I, HERBERT N. CURTIS, of New York, county of New York, State of New York, have invented an Improvement in Electric Conduits, of which the following description, in connection with the accompanying drawings, is a specification, like letters on the drawings representing like parts.

My invention relates to an electric conduit for street-railways and analogous uses, the object being to maintain a practically-closed conduit, while affording means for making connection between a traveling conductor outside and stationary conductor inside. The conduit is shown as made double, containing wires leading from both terminals of the generator of electricity; but it is obvious that the same construction might be employed where connection was to be made from the inside of the conduit with only one conductor, the other connection being made at the wheels of the vehicle and the rails or otherwise.

The invention is embodied in a conduit which may be made of any suitable material and has a narrow longitudinal slit or opening in its upper surface, which constitutes a portion of the roadway over which the vehicles travel and contains a current-supplying conductor suitably supported in the conduit below the said slit; and the said invention consists, mainly, in the combination, with such a structure, of a flexible conduit-slit cover contained within the conduit and normally pressed upward against the inner surface of the top thereof, so as to close the slit from below.

The said flexible cover is composed partly of conducting material, which is engaged by the external traveling conductor and pressed down into contact with the current-supplied conductor below as the vehicle travels along, so as to transmit the current from the internal to the external conductor, and said flexible strip is provided with strips of yielding insulating material, preferably soft rubber, which performs both the function of insulating the strip from the conduit and also that of a gasket or packing to make a water-tight joint with the walls of the conduit at the edges of the slit.

Figure 1:
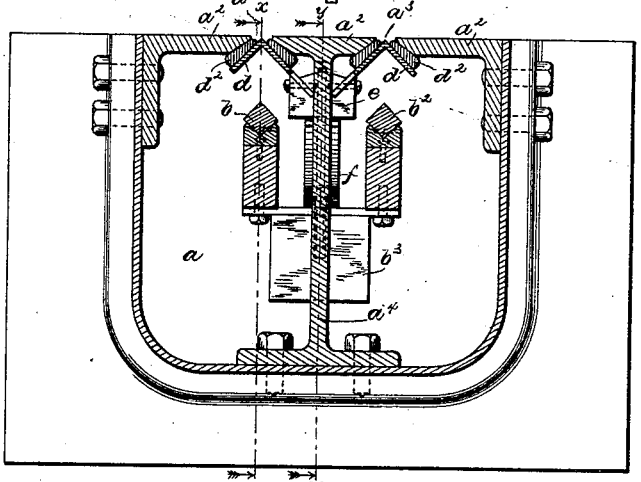
Figure 2:
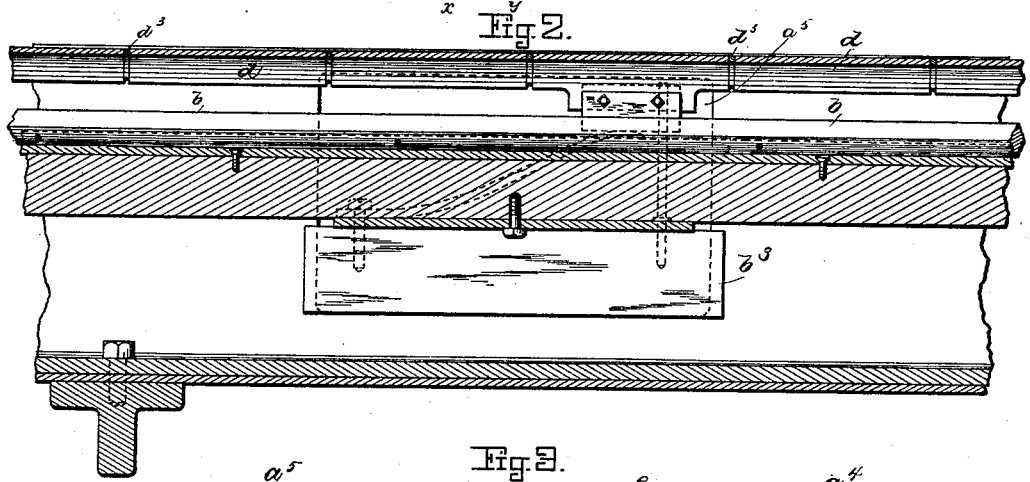
Figure 3:
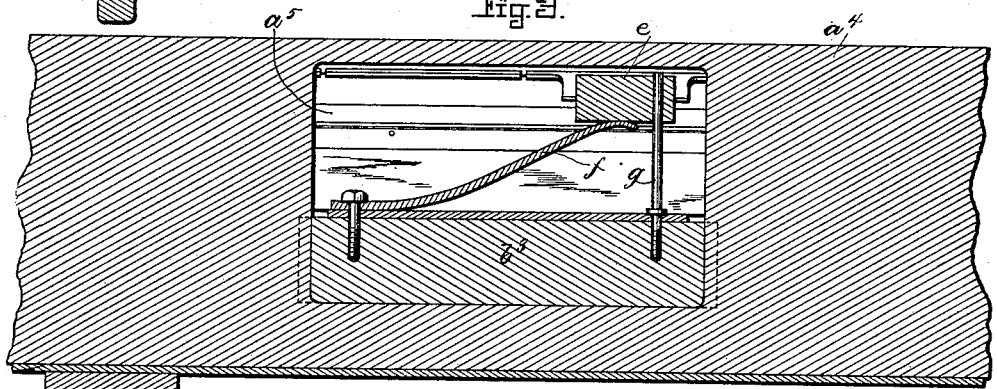
Figures 4, 5:
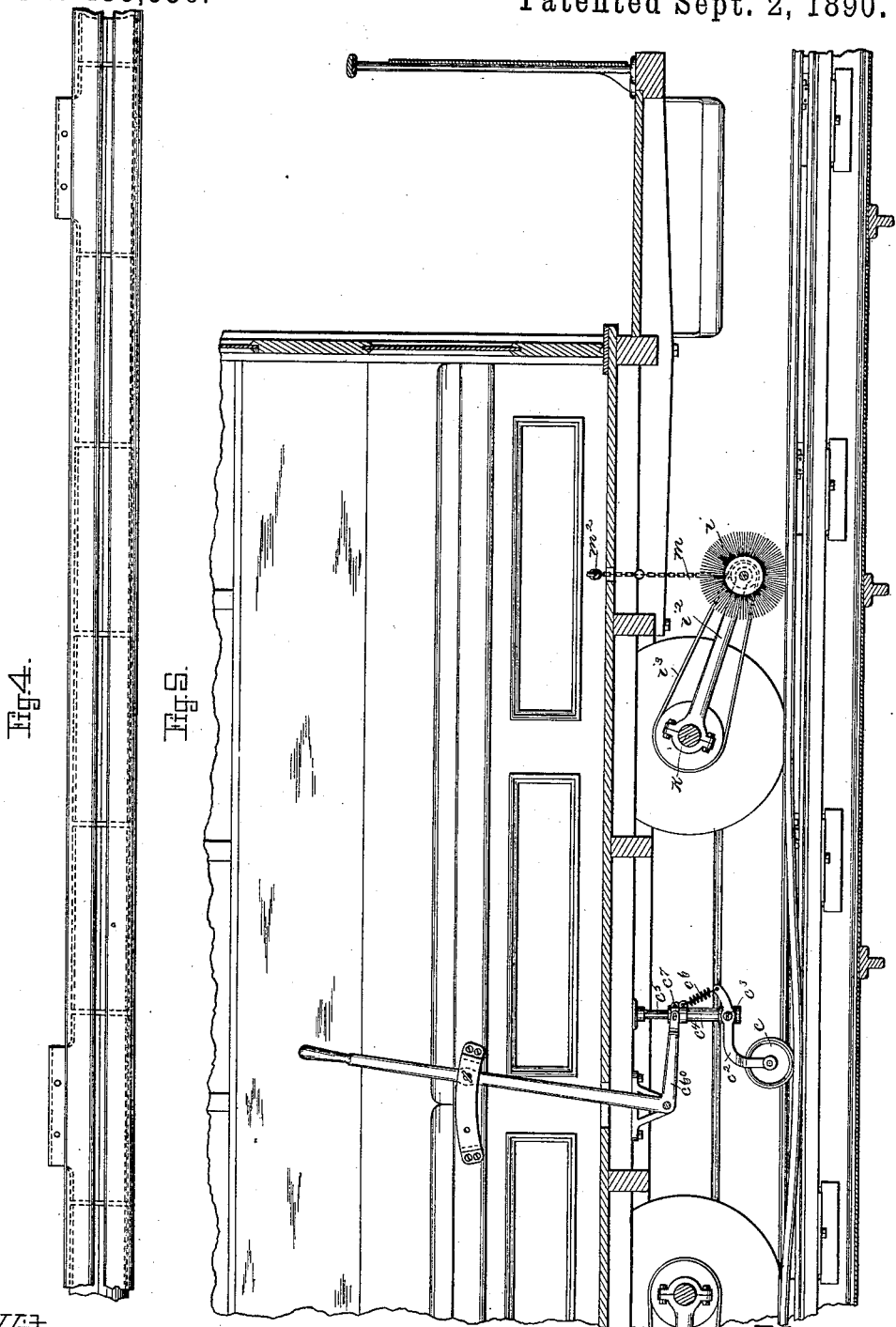

Figure 1 is a transverse vertical section of an electric conduit embodying this invention; Fig. 2, a longitudinal section thereof on line $x\ x$, Fig. 1, the arrows at the section-lines in all of the figures indicating the direction from which the corresponding sectional views are projected; Fig. 3, a longitudinal section on line $y\ y$, Fig. 1; Fig. 4, a plan view of the conduit on a smaller scale; Fig. 5, a sectional elevation of a portion of the conduit and vehicle; Fig., 6 a transverse vertical section showing a modified construction of the conduit, the two parts of the double conduit in this case being slightly different in construction from one another; Fig. 7, a longitudinal section on line $z$, Fig. 6; Fig. 8, a longitudinal section on line $x^2$, Fig. 6; Fig. 9, a side elevation of the trolley; and Fig. 10, a sectional elevation thereof on line $x^3$, Fig. 9.

The conduit $a$ may be of any suitable size, shape, and construction, it being essential only that it incloses a sufficient space to afford proper means for supporting the internal conductors or feed-wires $b\ b^2$ and other parts co-operating therewith that will be described. The top portion $a^2$ of the conduit constitutes a portion of the roadway and is provided with narrow longitudinal slits $a^3$ over the conductors $b\ b^2$, the portion of the said top between the slits being shown in this instance as a piece of angle-iron $a^4$, provided with suitable brackets $b^3$ for supporting the main conductors $b\ b^2$, which rest on substantially rigid beams extending from one bracket to the next, and are suitably insulated from the walls of the conduit.

In order to retain the slits $a^3$ of the conduit normally closed while providing for making a connection from the internal conductors to external conductors or trolley-wheels $c$, (see Figs. 5, 9, and 10,) the said conduit contains longitudinal flexible strips or conduit-covers, each composed of a piece of conducting material $d$ and pads or strips $d^2$ of insulating material, soft rubber being desirable on account of its yielding and flexible nature, said strips being mounted on yielding supports, which press them upward against the top wall of the conduit and into the slots thereof.

In order to make the entire cover more flexible, the conducting-strips $d$ may be made discontinuous, as shown, and as there is no need of electrical continuity (that being undesirable rather than desirable) the space between the ends of said conducting portions of the cover may be filled with strips $d^3$ of the yielding insulating material.

The yielding supports for the conduit-cover are shown in Figs. 1, 2, and 3 as consisting of blocks $e$ of insulating material with which the conducting portions of the covers are connected from point to point, the said blocks being pressed upward by springs $f$, so as to hold the cover firmly seated against the inside of the top of the conduit, which is preferably beveled or inclined from the edges of the slit, as shown, so as to make a better joint with the flexible cover-strip, in which the strips $d^2$ of insulating material both serve as an insulator to prevent the current from getting to the walls of the conduit and also as a packing or gasket, so as to make the cover water-tight when closed.

In the construction shown in Figs. 1, 2, and 3 both covers are connected with the same carrier-blocks $e$, which, with their springs, work in recesses $a^5$ in the central web $a$. Guide-pins $g$ are provided for the carrier-blocks $e$, to prevent them from being thrown out of position in their upward and downward movement and insure that the conducting portion of said covers will come into proper engagement with the inclosed conductors and that the covers will properly seat themselves in the conduit-slit when they are returned. The trolley-wheels bear upon the conduit-cover with sufficient pressure to overcome the yielding supports for the latter and press the said strips down onto the inclosed conductors $b\ b^2$, when the portions $d$ of said strips afford an electrical connection from the said inclosed conductors to the trolleys or other traveling conductors that engage therewith.

Figure 6:
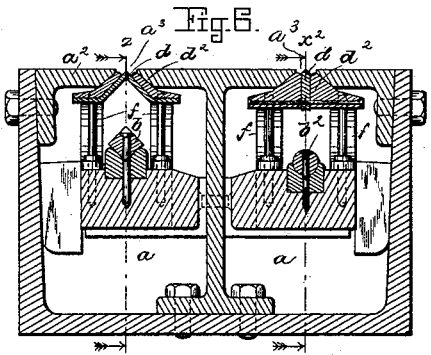
Figure 7:
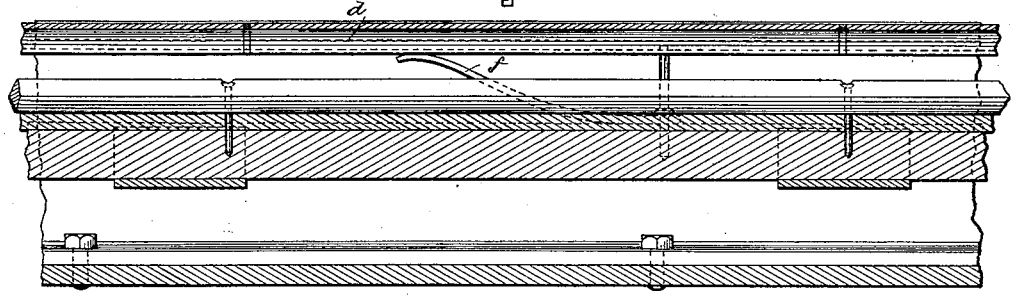
Figure 8:
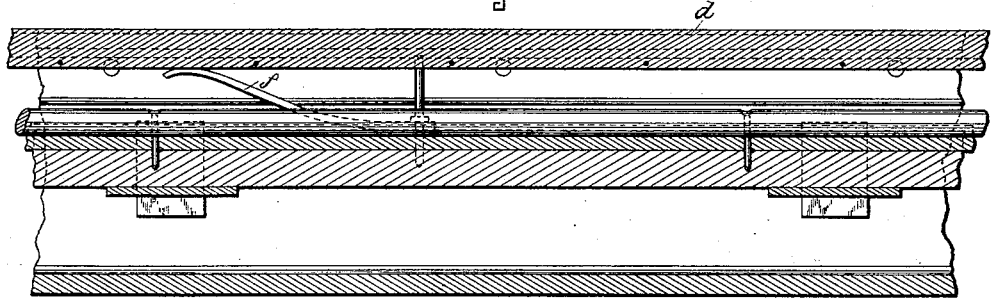
Figures 9, 10:
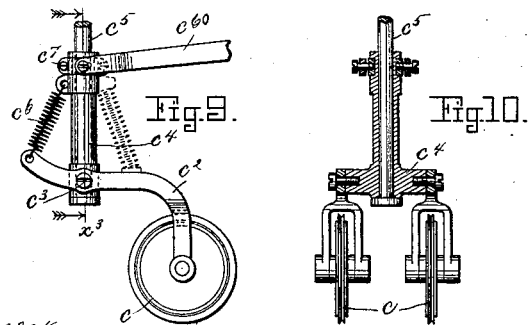

In the construction shown in Figs. 6, 7, and 8 the conduit is of slightly-different shape from that shown in Fig. 1. The central web has no opening through it, and each cover-strip is supported independently of the others. Otherwise the construction and mode of operation are substantially the same and the same lettering is used. A pair of supporting-springs $f$ are used for each cover-strip, as shown in Fig. 6, and in the construction shown at the right hand in said figure and in Fig. 8 the conducting portion $d$ is a thin vertical strip inclosed between heavier cheeks $d^2$ of the insulating material than in the other constructions, that shown in the left of Fig. 6 and in Fig. 7 having the conducting portion of the cover channel-shaped, the same as in Fig. 1. The trolley-wheels $c$ are supported in forked frames $c^2$, pivoted at $c^3$ upon a swiveled piece $c^4$, capable of longitudinal and swiveling movement upon a suitable standard $c^5$, rigidly connected with the car or vehicle, as shown in Fig. 5. The trolley-wheel frame $c^2$ is offset with relation to the swivel-piece, as shown in Figs. 5 and 9, and is acted upon by a stiff spring $c^6$, which enables it to yield vertically to a slight extent, the said offset in its frame causing the wheel to trail and enabling it to turn with relation to the body of the vehicle, so as to keep on the conducting portion of the cover as the vehicle passes around curves, &c. The swivel-piece $c^4$ is longitudinally movable on its supporting-standard $c^5$, so that the trolley may be raised wholly above the top of the conduit and road-bed when desired, said swivel-piece being shown as operated by a lever $c^{60}$, connected with a collar $c^7$, working in an annular groove around the swivel-piece, so that it controls its position longitudinally on the standard without interfering with its rotary movement thereon. The lever $c^{60}$ has a suitable operating-handle, (shown in this instance as placed inside the car,) by which it may be moved to raise and lower the trolley when desired.

The vehicle is provided with a brush or cleaning device $i$, journaled at the end of a hanger $i^2$, supported from the axle $k$ of the vehicle and driven by a belt $i^3$, passing over pulleys on the vehicle-axle and brush-shaft axle, respectively. The brush at the rear end of the vehicle may be removed from the conduit, the supporting-hangers $i^2$ being shown as provided with chains $m$ for raising and lowering the said hangers, each co-operating with a hook or support $m^2$ on the car.

The electric connections from the trolley to the motor on the car or other apparatus to be supplied by the current may be of any suitable or usual construction, as these devices form no part of the present invention, and when the track-rails are used as the return-circuit it will be necessary to use but one trolley-wheel and the conduit appliances co-operating therewith.

The conduit may be provided with usual means for draining the same, so that any water which may enter when the cover is open will pass easily off.

I claim—

1. An electric conduit provided with a longitudinal slit in its top and an inclosed conductor, combined with a flexible cover for said slit, comprising a conducting portion that makes contact with an external conductor extended into the slit and is pressed thereby into contact with the inclosed conductor, substantially as described.

2. An electric conduit provided with a longitudinal slit in its top and an inclosed conductor, combined with a flexible cover composed of a conducting-strip beneath the opening and above the inclosed conductor and strips of insulating material that seat against the inside of the walls of the conduit at the edges of the slit, substantially as described.

3. An electric conduit provided with a longitudinal slit in its top and an inclosed conductor, combined with a flexible cover for said slit, comprising a conducting portion that makes contact with an external conductor extended into the slit and is pressed thereby into contact with the inclosed conductor, carrying-blocks connected with the cover from point to point, and yielding upwardly-pressing supports for said carrier-blocks, substantially as described.

4. An electric conduit provided with a longitudinal slit in its top and an inclosed conductor, combined with a flexible cover-strip for said slit, comprising a conducting portion that makes contact with an external conductor extended into the slit and is pressed thereby into contact with the inclosed conductor, yielding upwardly-pressing supports for said strips, and guides upon which the said strip is movable toward and from the slitted portion of the conduit, substantially as described.

5. An electric conduit provided with a longitudinal slit in its top and an inclosed conductor, combined with a flexible cover for said slit, comprising a conducting portion that makes contact with an external conductor extended into the slit and is pressed thereby into contact with the inclosed conductor, and a trolley-wheel and a support therefor swiveled on a standard connected with the vehicle and vertically movable on said standard, substantially as described.

In testimony whereof I have signed my name to this specification in the presence of two subscribing witnesses.

HERBERT N. CURTIS.

Witnesses:
CLARENCE R. DEAN,
CHARLES H. WARNER.